UNITED STATES PATENT OFFICE.

CHARLES J. VAN DEPOELE, OF CHICAGO, ILLINOIS.

SECONDARY BATTERY.

SPECIFICATION forming part of Letters Patent No. 285,529, dated September 25, 1883.

Application filed April 19, 1883. (No specimens.)

*To all whom it may concern:*

Be it known that I, CHARLES J. VAN DEPOELE, of Chicago, in the county of Cook and State of Illinois, have invented new and useful Improvements in Secondary Batteries; and I do hereby declare that the following is a full, clear, and exact description thereof.

My invention relates to a new and useful improvement made in the art of forming plates for secondary batteries; and it consists in the method of treating the lead plates of such batteries chemically and electrically, as will be hereinafter described.

I am well familiar with the Planté system of forming the plates, which is very tedious and expensive. The Faure secondary plates are covered mechanically with a coating of minium or red lead, which is not intimately enough in contact, or does not adhere enough to the plates, in order to produce the best results, besides the process being tedious and expensive. I also have been referred to Kirchoff's method of forming plates for secondary batteries; but on examination I find that my process differs widely from anything I have been able to find as practiced by others.

The following is a specification of the process I use, and proves to be very efficient and more economical than any process now in use. The process can be applied to any form or shape of plates in such batteries. When the elements are properly constructed, consisting of a pair or more of plates, positive and negative, the elements are first cleaned chemically, so as to expose the bare lead to the subsequent operations. The plates are now dipped in a bath containing about seven parts water, two parts nitric, and one part sulphuric, acid, and the opposite plates of the elements are connected to a scource of electricity, and a current passed through the same for about an hour or so. The polarity is reversed and the plates acted upon reversely from the first charge. After a few hours the electrolytic action on the plates is stopped. One plate will be found covered with crystals of lead and the other with a coating of a white pigment of lead. The nitric acid in the bath, under the electrolytic action of the battery, dissolves part of the lead plate, forming nitrate of lead in solution, which would all be carried over to the opposite plate and there deposited in the form of crystals of lead were it not for the presence of the sulphuric acid in the bath. As fast as the nitrate of lead is formed it is precipitated upon the attacked plate in the form of a white pigment, insoluble in sulphuric acid and water, and adhering to the plate perfectly. This coating need not be very thick to give the best results. The electrolytic action being stopped, the plates should at once be placed in running water, in order to remove all free nitric acid on the plates. If any nitric acid remains present, local action will be set up and the plates would soon lose their charges. This local action is caused by the nitric acid attacking the lead and its salts in both plates, thus soon rendering the power of the battery *nil*, even after a long charge. The plates, being now free from nitric acid, are immersed in a bath containing eight parts water and two parts sulphuric acid, and are at once subjected to the action of an electric current. I find that it is not necessary to reverse the poles of the battery while charging, although it does no harm if the poles are reversed after a short period of charging in one direction. I find it sufficient, however, to charge as follows: The source of electricity should be so connected to the plates that the white precipitate upon the positive plate will be reduced to peroxide of lead, when said plate will turn a dark red, while the negative pole will be covered with a black coating of crystals of metallic lead. The element can now be discharged, and recharging can be begun at once. The charging and discharging should be repeated at intervals. In about six hours the battery is as good as it ever will be, and ready for use. Care should be taken not to overcharge the secondary—that is to say, the electro-motive force should be kept below that of the charging-generator, and then contact broken with the same. Care should also be taken that the polarity be not reversed in charging the secondary after the plates are well formed, as this is certain to destroy the formation on the plates.

I do not claim herein any of the subject-matter covered by Patent No. 276,099, and application No. 84,421, filed April 3, 1883, the present case being a division of said patent.

What I claim as new, and desire to secure by Letters Patent, is—

1. The herein-described method of treating the elements of secondary batteries, which consists in subjecting the elements to the action of dilute nitric and sulphuric acids; next, producing by electrolytic action deposits of the precipitates of lead salts and reduced lead upon the respective electrodes, then freeing the said deposits from nitric acid, and afterward subjecting said plates to electrolytic action until polarized, substantially as set forth.

2. The herein-described method of treating the lead plates of secondary batteries, which consists in first subjecting said plates to electrolytic action in a bath containing nitric acid, sulphuric acid, and water in order to obtain crystals of metallic lead on one plate and an insoluble adhering precipitate of sulphate of lead on the other plate; next, freeing said plates from nitric acid as soon as the above state is obtained, and subsequently placing them in a bath of sulphuric acid and water, and, by an electrolytic action applied to the plates, changing the lead sulphate on one plate into peroxide of lead, and depositing on the other plate a coating of spongy or reduced lead, all as described, and for the purpose set forth.

CHARLES J. VAN DEPOELE.

Witnesses:
  NORMAN T. GASSETTE,
  THEO. P. BAILEY.